(12) United States Patent
Lehto et al.

(10) Patent No.: US 8,821,686 B2
(45) Date of Patent: Sep. 2, 2014

(54) METHOD AND EQUIPMENT FOR TREATMENT OF BLACK LIQUOR AT PULP MILL

(75) Inventors: Jani Lehto, Tampere (FI); Kari Kuukkanen, Tampere (FI); Timo Honkola, Kangasala (FI)

(73) Assignee: Valmet Power Oy, Tampere (FI)

( * ) Notice: Subject to any disclaimer, the term of this patent is extended or adjusted under 35 U.S.C. 154(b) by 434 days.

(21) Appl. No.: 12/990,869

(22) PCT Filed: May 5, 2009

(86) PCT No.: PCT/FI2009/050362
§ 371 (c)(1),
(2), (4) Date: Feb. 2, 2011

(87) PCT Pub. No.: WO2009/135999
PCT Pub. Date: Nov. 12, 2009

(65) Prior Publication Data
US 2011/0120662 A1 May 26, 2011

(30) Foreign Application Priority Data

May 6, 2008 (FI) .................................. 20085416

(51) Int. Cl.
*D21C 11/04* (2006.01)
*D21C 11/06* (2006.01)
*D21C 11/12* (2006.01)

(52) U.S. Cl.
CPC ............... *D21C 11/04* (2013.01); *D21C 11/06* (2013.01); *D21C 11/125* (2013.01); *D21C 11/12* (2013.01)
USPC ........................................... 162/29; 162/30.1

(58) Field of Classification Search
CPC ........ D21C 11/04; D21C 11/06; D21C 11/12; D21C 11/125
USPC ................... 162/29, 30, 31, 32, 33, 34, 35, 36
See application file for complete search history.

(56) References Cited

U.S. PATENT DOCUMENTS

| 3,226,190 A | 12/1965 | Rosenfeld |
| 4,872,950 A | 10/1989 | Andersson et al. |

(Continued)

FOREIGN PATENT DOCUMENTS

| CN | 1886552 A | 12/2006 |
| WO | WO 8607396 A1 | 12/1986 |
| WO | 2004/005610 A1 | 1/2004 |
| WO | 2005/045126 A1 | 5/2005 |

OTHER PUBLICATIONS

Cesco solutions, Pulp and Paper Clarification principles [downloaded online Nov. 13, 2013].*

(Continued)

*Primary Examiner* — Anthony Calandra
(74) *Attorney, Agent, or Firm* — Ladas & Parry LLP

(57) ABSTRACT

The invention relates to a method and equipment for treatment of black liquor at a pulp mill in order to recover chemicals and energy contained therein. In the invention, the black liquor is pyrolyzed in a pyrolysis reactor (4), the formed gaseous components are forwarded for utilization and the solids are mixed with water, whereby the formed solids are returned to a lime burning kiln (1) and the sodium-hydroxide-containing liquid is returned to the pulp cooking process.

16 Claims, 1 Drawing Sheet

(56) References Cited

U.S. PATENT DOCUMENTS

| | | | |
|---|---|---|---|
| 5,112,216 A * | 5/1992 | Tenn | 431/5 |
| 5,490,907 A * | 2/1996 | Weinwurm et al. | 203/29 |
| 6,123,806 A * | 9/2000 | Roberts | 162/14 |
| 2005/0284593 A1 * | 12/2005 | Sundman et al. | 162/30.11 |
| 2006/0201641 A1 | 9/2006 | Harris et al. | |

OTHER PUBLICATIONS

Supplementary European Search Report dated Sep. 2, 2011 in respect of EP Application No. 09742199.4-2124.

* cited by examiner

METHOD AND EQUIPMENT FOR TREATMENT OF BLACK LIQUOR AT PULP MILL

BACKGROUND OF THE INVENTION

The invention relates to a method for treating black liquor at a pulp mill in order to recover chemicals and energy contained therein. Further, the invention relates to equipment for treating black liquor at a pulp mill in order to recover chemicals and energy contained therein.

In the pulping process, wood raw material, such as chips, is treated by cooking it in a chemical solution containing lye, among other things. After cooking, fibre pulp detached from the wood material is separated from the cooking liquor, in which various components of wood material, such as lignin, dissolved during cooking will remain. The chemical mixture separated after cooking, i.e. black liquor, is evaporated in an evaporation plant in order to obtain combustible material containing as little water as possible. The dry solids content of the material from the last phase of the evaporation plant, and conventionally introduced into a soda recovery boiler for burning, may be up to 85%.

Conventionally, black liquor is burnt in a soda recovery boiler, which results in obtaining heat, whereby water is heated and vaporized for producing energy, and the salt melts and cooking chemicals are reproduced therefrom. This solution is presented, for instance, in Finnish Patents 82494 and 91290. Attempts have been made to replace the soda recovery boiler, for instance, by gasifying black liquor, but in practice, a commercially competitive solution has not yet been achieved.

WO publication 2004/005610 sets forth a solution, in which black liquor is pyrolysed and the coke produced in pyrolysis is gasified. However, this process is difficult in practice and it requires separate, expensive gasification equipment.

BRIEF DESCRIPTION OF THE INVENTION

The object of the present invention is to provide a method and equipment for treatment of black liquor, whereby a soda recovery boiler may be omitted in the whole process and which is simple and ready to implement mainly with the existing pulp mill equipment.

The method of the invention is characterized by
- introducing black liquor into a pyrolysis reactor having substantially oxygen-free conditions
- introducing calcium oxide from a lime burning kiln into the pyrolysis reactor
- separating from one another gaseous components and solid matter produced in the pyrolysis reactor
- conveying the separated gaseous components for further utilization and
- adding water to the separated solid matter, whereby is formed an aqueous solution of sodium hydroxide that is reintroduced into the pulping process and the residual solid matter is returned to the lime burning kiln.

The equipment of the invention is characterized by comprising:
- a pyrolysis reactor, into which black liquor is introduced and where the black liquor is pyrolysed substantially under oxygen-free conditions forming gaseous components and solid matter
- means for feeding calcium oxide from a lime burning kiln into the pyrolysis reactor
- means for separating from one another gaseous components and solid matter produced in the pyrolysis reactor
- a mixing reactor, in which the separated solid matter is mixed with water to obtain an aqueous solution of sodium hydroxide, which is reintroduced into the pulping process, and solid matter and
- means for returning said solid matter to the lime burning kiln.

The basic idea of the invention is that the black liquor is pyrolysed by feeding black liquor and calcium oxide into the same pyrolysis reactor, in which the black liquor is heated to a suitable temperature under substantially oxygen-free conditions so that evaporable substances contained in the black liquor are converted to a gaseous state. Further, the basic idea of the invention is that gaseous components are separated from solid matter and conveyed for utilization in production of electricity, for instance, and the solid matter is mixed with water, whereby there are produced sodium hydroxide in solution form and carbon and calcium carbonate in solid form, which will be recirculated. Yet another basic idea of the invention is that calcium oxide for pyrolysis is produced by means of a standard lime burning kiln, such as lime sludge reburning kiln, grate furnace or another suitable furnace, at a pulp mill, and correspondingly, the carbon and the calcium carbonate may be returned to the same furnace. According to an embodiment of the invention, inert gas or gas mixture is introduced into the pyrolysis reactor. According to yet another embodiment of the invention, the gaseous components formed in the pyrolysis reactor are conveyed for further processing, such as purification and/or condensation. According to yet another embodiment of the invention, the calcium oxide is fed into the pyrolysis reactor so hot that it heats the black liquor to a temperature required for pyrolysis.

The method of the invention has an advantage that one circulation of chemicals allows recovery of energy and chemicals, and the pyrolysis oil separated from the gaseous components by condensation may be used as a fossil fuel substitute, or if so desired, further processed to serve as a vehicle fuel. A further advantage is that, because the pyrolysis is fast, gas formation is maximised. In addition, because the temperature of pyrolysis is low, corrosion and fouling problems appearing in the conventional soda recovery boilers are avoided.

BRIEF DESCRIPTION OF THE DRAWINGS

The invention will be described in greater detail in connection with the attached drawings, in which.

DETAILED DESCRIPTION OF THE INVENTION

Figure 1:
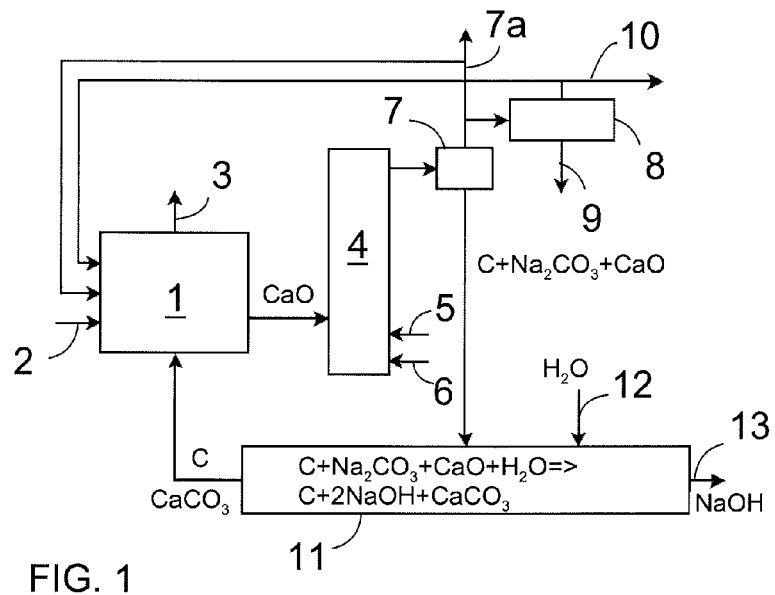
FIG. 1 is a schematic view of an apparatus for applying a method of the invention.

FIG. 1 shows schematically equipment applicable for implementing a method of the invention. It comprises a lime burning kiln 1, which may typically be a lime sludge reburning kiln or another suitable furnace, where lime is burnt into calcium oxide. Into the lime burning kiln there is introduced calcium carbonate that becomes calcium oxide in the lime burning kiln. In addition, into the lime kiln it is possible to feed carbon that burns into carbon dioxide. The heat required for lime burning is mainly obtained from carbon combustion, but additionally some known solid, liquid or gaseous auxiliary fuel 2, such as oil, gas or the like, may be fed into the lime burning kiln. From the lime burning kiln the flue gases 3 formed therein will be conveyed in a manner known per se for purification and optionally for heat recovery.

From the lime burning kiln the calcium oxide produced therein and typically having a temperature of 200 to 1000° C. is conveyed to a pyrolysis reactor 4, into which is also introduced black liquor 5 and fluidizing medium 6. The pyrolysis reactor 4 may be any suitable reactor, such as a fluidized-bed furnace or the like.

The fluidizing gas 6 is an inert gas or gas mixture. For that purpose it is possible to use purely inert gases, but it is considerably more economical to use e.g. uncondensed gases explained below or gases containing reacted gases or gas mixtures, such as carbon monoxide, carbon dioxide, nitrogen, nitrogen oxides or steam. Further, as a fluidizing gas it is even possible to use flue gases from which solid matter is removed, such as flue gases from the lime burning kiln.

In the pyrolysis reactor 4 the temperature is about 200 to 1000° C., preferably 400 to 600° C. When hot calcium oxide at a temperature of 200 to 1000° C. is introduced therein, it heats the black liquor. In addition, the reaction of calcium oxide with water that enters the pyrolysis reactor along with the black liquor, for instance, generates more heat. In that case, from the material contained in the black liquor the reactor produces gaseous components which together with solid matter are conveyed to a separator 7, which may be a conventional cyclone separator, for instance. In the separator 7 the solids are separated from the gaseous components 7a, which are conveyed for further processing or for use as such in the gaseous form, for instance, for the preparation of vehicle fuels or as an auxiliary fuel in the lime burning kiln. Alternatively, the gases may be conveyed to a condenser 8. In the condenser, the condensing gases form oil 9 that is conveyed for use as a fuel, for instance, in production of electrical energy or it may be further processed to serve as vehicle fuel, for instance. This oil may also be used as an auxiliary fuel in the lime burning kiln. Uncondensed gases 10, in turn, are forwarded either to the production of electricity or to be utilized otherwise, and at least part of them may be recycled back to the lime burning kiln to serve as an auxiliary fuel or a fluidizing gas 6.

Separated solids are conveyed to a mixing reactor 11, into which water 12 is also introduced. The water and the solids react with one another, whereby the following reactions occur:

$$C+Na_2CO_3+CaO+H_2O \rightarrow C+2NaOH+CaCO_3. \qquad (1)$$

From this, the sodium hydroxide NaOH in liquid form and other material in liquid form are separated from the solids and conveyed back to the pulp cooking process. Correspondingly, the calcium carbonate $CaCO_3$ and the carbon C are conveyed back to the lime burning kiln, where the calcium carbonate burns to calcium oxide and the carbon burns to carbon dioxide and to some extent to carbon monoxide.

Figure 2:
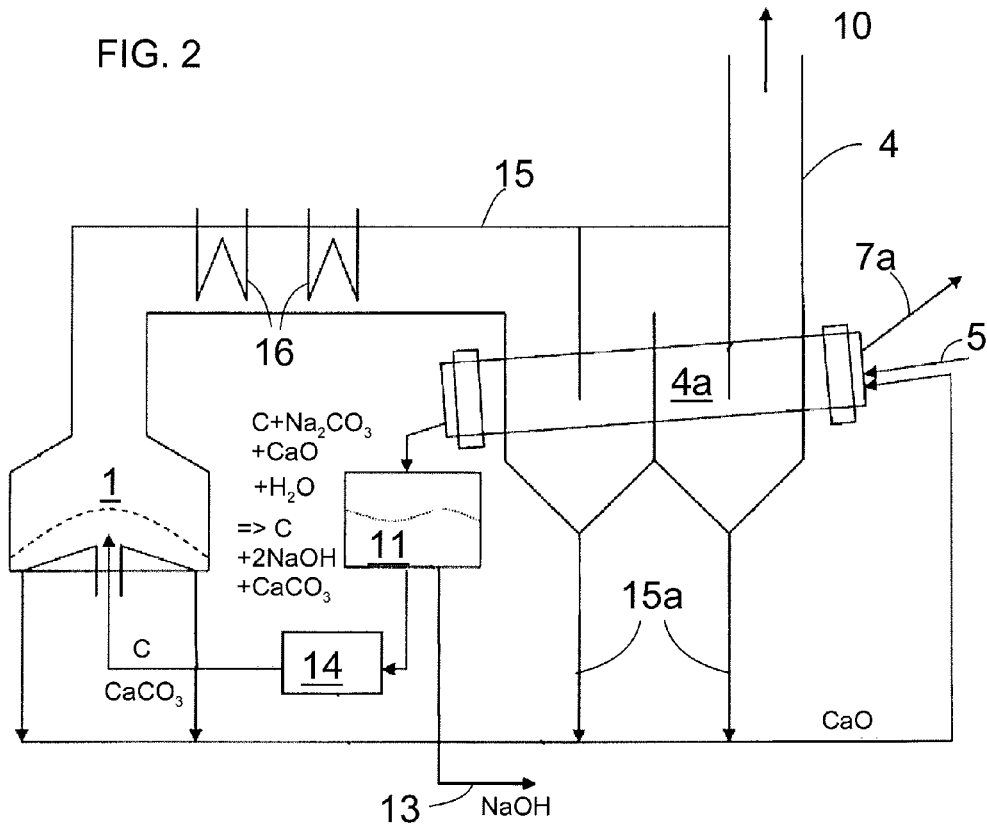
FIG. 2 is a schematic view of another apparatus for applying the method of the invention.

FIG. 2 shows schematically a second equipment applicable for implementing the method of the invention. For components corresponding to those in FIG. 1, like reference numerals refer to like parts and they are not explained separately unless necessary for the understanding of the matter. The solution of FIG. 2 differs from that of FIG. 1 in that the lime burning kiln employed is a grate furnace, in this example a furnace with a rotating grate, and the pyrolysis reactor is a rotating furnace that is heated from outside.

The lime burning kiln is a so-called rotating grate furnace, into which the calcium carbonate from the mixing reactor 11 and the carbon are fed at the centre of the furnace. A furnace of this kind is extremely suitable for burning moist material, such as the calcium carbonate separated from water and the carbon are in practice. If necessary, this material may further be dried separately in a separate dryer 14 that is placed between the mixing reactor 11 and the lime burning kiln 1.

In this case the pyrolysis reactor 4 is a tubular furnace 4a that is locating mainly in a horizontal direction and that may also rotate about its longitudinal axis. Black liquor and calcium oxide are preferably introduced into a slightly inclined, tubular furnace at the upper end thereof, i.e. the inlet end, and correspondingly solid material is discharged from the lower end of the tubular furnace, i.e. the outlet end, to the mixing reactor 11. Inside the furnace there may also be a longitudinal mixer or feed screw that transfers solid matter at a suitable rate through the furnace. The gaseous components formed in the pyrolysis reactor 4 are removed from the upper end side of the tubular furnace 4a and conveyed for further use or processing as presented in connection with FIG. 1. This embodiment does not require a proper separator for separating solids and gases from one another, but the furnace acting as the pyrolysis reactor 4 acts at the same time as a means for separating them.

Flue gases from the lime burning kiln 1 are conveyed through a separate channel 15 to heat the pyrolysis reactor 4. Around the tubular furnace there is constructed most preferably a thermally isolated channel system or space, through which the flue gases from the lime burning kiln 1 flow such that the flue gases enter the pyrolysis reactor 4 at the discharge end of the tubular furnace 4a and flow then onwards towards the inlet end of the furnace 4a, wherefrom the flue gases are than removed to be treated in a desired manner. Thus, counterflow heating takes place in the pyrolysis reactor, whereby black liquor to be pyrolyzed continuosly heats up as it proceeds through the furnace towards the outlet end. In the flue gas channel 15 it is preferable to provide at least one outlet channel 15a, at the pyrolysis reactor or another suitable place, for removing and conveying calcium oxide and other solid matter separating the flue gases to the pyrolysis reactor, for instance.

Instead of or in addition to the heating carried out by the flue gases of the lime burning kiln the pyrolysis reactor may be heated by using burners, which employ liquid or gaseous fuel, by conveying their hot combustion gases to heat the pyrolysis reactor.

When separate outside heating is used for the pyrolysis reactor, the temperature of the calcium oxide to be fed therein may be lower, because the calcium oxide need not be able to heat the black liquor to the temperature of pyrolysis, but it takes place by additional heating. Therefore, on feeding the temperature of calcium oxide may be just 200° C. or more.

In case the temperature tends to rise excessively in view of the operation of the pyrolysis reactor 4, or the flue gases exit excessively hot, the flue gases may be cooled, prior to feeding them to heat the pyrolysis reactor 4, with cooler solutions known per se, such as heat delivery surfaces 16, in which heat of the flue gases is recovered and utilized somewhere else in the process.

Instead of the flue gas heating, it is also possible to employ some other heating method, by which the temperature of the pyrolysis reactor 4 may be made suitable for pyrolysis, preferably about 400 to 600° C.

When a horizontal furnace is used as the pyrolysis reactor 4, no separate fluidizing gas is needed.

Thus, the method of the invention does not require a conventional soda recovery boiler, but the recovery of chemicals in black liquor may be implemented mainly by means of the pyrolysis reactor, whose size and investment costs are a fraction of those of the soda recovery boiler. Likewise, the operating costs of the pyrolysis reactor are relatively low as compared with the soda recovery boiler. In addition, when the gas formed in the pyrolysis reactor may be utilized or further processed to be used as a fuel for gas turbines or diesel power plants, it is possible to produce the electricity and steam required by the process in a considerably more efficient manner than by means of conventional soda recovery boiler solutions. Also, when the method of the invention is applied, it is possible to avoid expensive gasifier solutions, which at least so far have proved to be fairly difficult to apply.

The lime burning kiln used may be any furnace known per se, by which lime may be burnt from calcium carbonate to calcium oxide. It is advantageous, however, to use an existing lime sludge reburning kiln or grate furnace known per se. The pyrolysis reactor may be any reactor suitable for the purpose, but the use of horizontal, rotating cylindrical furnaces is advantageous, because their operation and behaviour is well known and well controllable. The mixing reactor in turn, may be any suitable mixing reactor, into which the solid matter from the separator and water may be introduced and wherefrom a solution and solid matter may be removed in a suitable manner. After the mixing reactor, it is also possible to use a separate separator, whereby water is separated from the solid matter. If necessary, solid matter may be dried prior to feeding it into the lime burning kiln.

The invention is described above in the specification and the drawings by way of example, and it is not limited thereto in any way, but the scope is defined in accordance with the attached claims. Thus, individual features of various exemplary embodiments may also be applied in a desired manner in other embodiments.

The invention claimed is:

1. A method for treating black liquor at a pulp mill in order to recover chemicals and energy contained therein by,
    introducing black liquor into a pyrolysis reactor
    introducing calcium oxide from a lime burning kiln into the reactor to produce gaseous components and a solid mixture of carbon, sodium carbonate and calcium oxide
    separating from one another gaseous components and solid matter produced in the reactor
    conveying the separated gaseous components for further utilization and wherein gaseous components are condensed in a condenser, the product being oil, and at least part of the gases uncondensed in the condenser are conveyed for recycling in the lime burning kiln and
    adding water to the separated solid matter, whereby is formed an aqueous solution of sodium hydroxide and a solid mixture of carbon and calcium carbonate, said sodium hydroxide solution being reintroduced into the pulping process and the residual solid matter is returned to the lime burning kiln,
    which comprises heating the reactor and the black liquor with heat introduced into the pyrolysis reactor with the calcium oxide from the lime kiln, wherein the calcium oxide at a temperature of 200 to 1000° C. is introduced into the pyrolysis reactor and heating the pyrolysis reactor by providing heat from an outside generated source around the pyrolysis reactor with flue gases from the lime burning kiln, and
    conveying calcium carbonate and carbon from the reactor back to the lime-burning kiln.

2. The method of claim 1, characterized by conveying gaseous components and solids formed in the pyrolysis reactor into a separator for separating them from one another.

3. The method of claim 1, comprises conveying inert gas or gas mixture, in which the black liquor is mixed into the pyrolysis reactor.

4. The method of claim 3, wherein the gas or the gas mixture to be conveyed to the pyrolysis reactor at least partly consists of residual gases uncondensed in the condensation of gases obtained from the pyrolysis reactor.

5. The method of claim 3, whereinin the gas or the gas mixture to be conveyed to the pyrolysis reactor at least partly consists of carbon dioxide or carbon monoxide.

6. The method of claims 3, wherein the gas or the gas mixture to be conveyed to the pyrolysis reactor at least partly consists of nitrogen or nitrogen oxides.

7. The method of claims 3, wherein the gas or the gas mixture to be conveyed to the pyrolysis reactor at least partly consists of flue gases.

8. The method of claim 1, wherein the temperature in the pyrolysis reactor is 200 to 1000° C.

9. The method of claim 1, which comprises using a substantially horizontal, cylindrical furnace as the pyrolysis reactor.

10. The method of claim 9, which comprises rotating the cylindrical furnace during the pyrolysis.

11. The method of claim 2, wherein a cyclone is used as the separator.

12. The method of claim 9, wherein gaseous products and solids formed in the horizontal, cylindrical furnace acting as the pyrolysis reactor are separated in said reactor.

13. The method of claim 1, wherein a slime sludge reburning kiln is used as the lime burning kiln.

14. The method of claim 1, wherein a grate furnace is used as the lime burning kiln.

15. The method according to claim 1, wherein the calcium oxide introduced into the pyrolysis reactor is at temperature of 400 to 600°C.

16. The method according to claim 8, wherein the pyrolysis reactor is at temperature of 400 to 600°C.

* * * * *